United States Patent
Shimoda

(10) Patent No.: US 7,013,691 B2
(45) Date of Patent: Mar. 21, 2006

(54) PERIPHERAL LENGTH ADJUSTING APPARATUS AND PERIPHERAL LENGTH ADJUSTING METHOD FOR ENDLESS METALLIC RING

(75) Inventor: Koji Shimoda, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 44 days.

(21) Appl. No.: 10/777,727

(22) Filed: Feb. 13, 2004

(65) Prior Publication Data

US 2004/0159137 A1   Aug. 19, 2004

(30) Foreign Application Priority Data

Feb. 13, 2003   (JP)   ............... 2003-034616

(51) Int. Cl.
   *B21D 15/00*   (2006.01)

(52) U.S. Cl. .............. 72/110; 72/111; 72/378; 72/8.5; 72/8.9

(58) Field of Classification Search ............ 72/8.3, 72/8.5, 8.9, 11.1, 11.3, 11.6, 12.2, 12.7, 107, 72/110, 111, 183, 205, 378
   See application file for complete search history.

(56) References Cited

U.S. PATENT DOCUMENTS

| 3,860,803 | A | | 1/1975 | Levine |
| 6,318,140 | B1 | * | 11/2001 | Yamagishi et al. ............ 72/110 |
| 6,843,090 | B1 | * | 1/2005 | Sato et al. .................... 72/110 |
| 6,854,310 | B1 | * | 2/2005 | Narusaki et al. .............. 72/110 |

FOREIGN PATENT DOCUMENTS

| EP | 1 008 401 A2 | 6/2000 |
| EP | 1 092 488 | 4/2001 |
| EP | 1 393 833 A1 | 3/2004 |
| JP | 11-290971 A | 10/1999 |
| JP | 2001-105050 A | 4/2001 |
| WO | WO 02/38302 | 5/2002 |

OTHER PUBLICATIONS

German Office Action for corresponding German Patent Application No. 10 2004 006 284.6, Issued Aug. 12, 2005.
English Translation of German Office Action for corresponding German Patent Application No. 10 2004 006 284.6, Issued Aug. 12, 2005.

* cited by examiner

*Primary Examiner*—Ed Tolan
(74) *Attorney, Agent, or Firm*—Kenyon & Kenyon

(57) ABSTRACT

In a peripheral length adjusting apparatus and a peripheral length adjusting method for an endless metallic ring, an endless metallic ring is wound on plural rollers, and an interval between the plural rollers is enlarged such that the endless metallic ring is stretched while the plural rollers are rotated, whereby the endless metallic ring is plastically deformed and a peripheral length of the endless metallic ring is adjusted to a target peripheral length. In the peripheral length adjusting apparatus and the peripheral length adjusting method, the peripheral length of the endless metallic ring before adjustment is measured, and the peripheral length of the endless metallic ring is adjusted to the target peripheral length by enlarging the interval between the rollers based on the measured peripheral length such that the peripheral length of the endless metallic ring at the time of adjustment is longer than the target peripheral length by a contraction amount due to elastic deformation of the endless metallic ring after adjustment.

12 Claims, 6 Drawing Sheets

PERIPHERAL LENGTH ADJUSTING APPARATUS AND PERIPHERAL LENGTH ADJUSTING METHOD FOR ENDLESS METALLIC RING

INCORPORATION BY REFERENCE

The disclosure of Japanese Patent Application No. 2003-034616 filed on Feb. 13, 2003, including the specification, drawings and abstract is incorporated herein by reference in its entirety.

BACKGROUND OF THE INVENTION

1. Field of the Invention

The invention relates to an endless metallic belt formed by annularly arranging multiple plate-shaped elements that face each other, and passing an endless metallic ring through the elements so as to annularly join the elements. More particularly, the invention relates to a peripheral length adjusting apparatus and a peripheral length adjusting method which improves an accuracy of a peripheral length of an endless metallic ring.

2. Description of the Related Art

There is a vehicle including a continuously variable transmission (hereinafter, referred to as "CVT") which continuously adjusts a speed ratio according to a running state of the vehicle. The CVT can efficiently transmit an engine output, and contributes to improving fuel efficiency and running performance. In one of CVTs that are put into practical use, a metallic belt and a pair of pulley are used, and an effective radius of each pulley is changed by a hydraulic pressure such that the speed ratio is continuously changed. In this CVT, an endless metallic belt is wounded on an input side pulley fitted to an input shaft and an output side pulley fitted to an output shaft. Each of the input side pulley and the output side pulley includes a pair of sheaves in which a groove width can be continuously changed. By changing the groove width of each of the input side pulley and the output side pulley, a belt-winding radius with respect to each of the input side pulley and the output side pulley is changed. Thus, a ratio between the rotational speed of the input shaft and the rotational speed of the output shaft, that is, the speed ratio can be continuously changed.

Conventionally, a metallic ring which is used for such an endless metallic belt is produced in the following manner. First, both ends of a thin plate of super-strong steel such as maraging steel are bonded by welding such that a ring-shaped drum is formed. Then, the drum is cut at a predetermined width, and is rolled out, whereby a metallic ring with a predetermined thickness is obtained. The metallic ring with the predetermined thickness obtained by rolling is subjected to solution heat treatment, and then peripheral length adjusting processing, whereby the peripheral length of the metallic ring is adjusted to a desired peripheral length. Further, the metallic ring is subjected to aging treatment and nitriding treatment, whereby hardness of the metallic ring is increased. Plural metallic rings with peripheral lengths which are slightly different from each other are laminated to be used for the endless metallic belt. Accordingly, the peripheral length adjusting processing is extremely important for laminating plural metallic rings to be used for the endless metallic belt.

Japanese Patent Laid-Open Publication No. 11-290971 discloses a peripheral length adjusting apparatus which performs peripheral length adjusting processing. The apparatus includes a drive roller and a driven roller on which a metallic ring is wound, and a correction roller which is provided between the drive roller and the driven roller.

In the peripheral length adjusting apparatus disclosed in Japanese Patent Laid-Open Publication No. 11-290971, the metallic ring is wound on the drive roller, the driven roller, and the correction roller. First, the driven roller is displaced such that the metallic ring is tensed. Then, while the drive roller is rotated, a displacement amount of the driven roller is measured by a displacement sensor with the metallic ring being tensed. An actual peripheral length of the metallic ring is calculated based on a center distance between the drive roller and the driven roller. Based on a difference between the actual peripheral length thus obtained and a desired peripheral length, a displacement amount of the correction roller, which is required for adjusting the peripheral length of the metallic ring to the desired peripheral length, is calculated. By applying urging force to the correction roller so as to move the correction roller by the calculated displacement amount, the metallic ring is plastically deformed. When the actual displacement amount of the correction roller matches the calculated displacement amount, application of the urging force to the correction roller is cancelled. The actual peripheral length of the metallic ring after the adjusting processing is calculated based on the center distance between the drive roller and the driven roller while the metallic ring is tensed by the driven roller. A difference between the actual peripheral length after the adjusting processing and the desired peripheral length is obtained. When the actual peripheral length matches the desired peripheral length, the operation is finished.

According to such a peripheral length adjusting method, an operation of applying the urging force to the correction roller needs to be repeated plural times until the actual peripheral length of the metallic ring is adjusted to the desired peripheral length, which is troublesome. Japanese Patent Laid-Open Publication No. 2001-105050 discloses a peripheral length correction method for a metallic ring which can adjust a peripheral length of a metallic ring to a desired peripheral length easily and reliably.

The peripheral length correction method disclosed in Japanese Patent Laid-Open Publication No. 2001-105050 includes the steps of winding a metallic ring on a drive roller and a driven roller which can be relatively displaced in a displacement direction so as to be away from each other, and a correction roller which is provided between the drive roller and the driven roller, and which can be displaced in a direction orthogonal to the displacement direction of the drive roller and the driven roller; maintaining the drive roller and the driven roller at a predetermined interval, and displacing the correction roller by a predetermined displacement amount with respect to a reference value of the peripheral length of the metallic ring in the direction which is orthogonal to the displacement direction of the drive roller and the driven roller and in which the metallic ring is stretched; obtaining an actual peripheral length of the metallic ring which is wounded on the drive roller, the driven roller, and the correction roller, while the drive roller and the driven roller are relatively displaced in the displacement direction so as to be away from each other by predetermined force, and the metallic ring is tensed by the drive roller and the driven roller; comparing the actual peripheral length of the metallic ring and the reference value of the peripheral length of the metallic ring so as to obtain a difference therebetween; and correcting the displacement amount of the correction roller according to the difference between the actual peripheral length of the metallic ring and the reference value.

According to the peripheral length correction method disclosed in Japanese Patent Laid-Open Publication No. 2001-105050, the drive roller and the driven roller on which the metallic ring is wounded are maintained at the predetermined interval, and the correction roller which is provided between the drive roller and the driven roller is displaced in the direction which is orthogonal to the displacement direction of the drive roller and the driven roller, and in which the metallic ring is stretched, whereby the metallic ring is plastically deformed, and the peripheral length is adjusted. Basically, the correction roller is displaced by the predetermined displacement amount with respect to the reference value of the peripheral length of the metallic ring. As the reference value, for example, a value which is set, for design and process management, as the peripheral length of the metallic ring after the rolling processing and the solution heat treatment is employed. The actual peripheral length of the metallic ring is obtained while the drive roller and the driven roller are relatively displaced in the displacement direction so as to be away from each other by predetermined force, and the metallic ring is tensed by the drive roller and the driven roller. Then, the difference between the actual peripheral length and the reference value is obtained, and the displacement amount of the correction roller is adjusted according to the difference. Therefore, the displacement amount of the correction roller with respect to the actual peripheral length can be obtained based on the reference value. Accordingly, the peripheral length of the metallic ring can be adjusted to the desired peripheral length easily and reliably by performing the operation of displacing the correction roller only once, and the yield can be enhanced.

After the endless metallic ring whose peripheral length is thus adjusted is removed from the drive roller and the driven roller, the peripheral length of the endless metallic ring is contracted due to elastic deformation, as compared with when the peripheral length is adjusted. It is possible to enlarge the interval between the rollers for adjusting the peripheral length considering such a contraction amount of the peripheral length (hereinafter, referred to as "spring back amount"). However, the spring back amount varies according to the peripheral length of the endless metallic ring before adjustment. Since the peripheral length of the endless metallic ring before adjustment has a deviation, the accuracy of the peripheral length of the endless metallic ring deteriorates.

SUMMARY OF THE INVENTION

In view of the above, it is an object of the invention to provide a peripheral length adjusting apparatus and a peripheral length adjusting method which improves an accuracy of a peripheral length of an endless metallic ring.

An aspect of the invention relates to a peripheral length adjusting apparatus for an endless metallic ring in which an endless metallic ring is wound on plural rollers, and an interval between the plural rollers is enlarged such that the endless metallic ring is stretched while the plural rollers are rotated, whereby the endless metallic ring is plastically deformed and a peripheral length of the endless metallic ring is adjusted to a target peripheral length. The peripheral length adjusting apparatus includes a peripheral length measuring device which measures the peripheral length of the endless metallic ring before the peripheral length is adjusted; and an adjusting device which adjusts the peripheral length of the endless metallic ring to the target peripheral length by enlarging the interval between the rollers based on the measured peripheral length such that the peripheral length of the endless metallic ring when the peripheral length is adjusted is longer than the target peripheral length by a contraction amount due to elastic deformation of the endless metallic ring after the peripheral length is adjusted.

In the aforementioned peripheral length adjusting apparatus for an endless metallic ring, the adjusting device adjusts the peripheral length of the endless metallic ring to the target peripheral length by enlarging the interval between the rollers. At this time, the adjusting device enlarges the interval between the rollers based on the peripheral length before adjustment such that the peripheral length of the endless metallic ring when the peripheral length is adjusted is longer than the target peripheral length by the contraction amount due to elastic deformation of the endless metallic ring after adjustment. Thus, since the peripheral length is adjusted considering the contraction amount due to elastic deformation based on the peripheral length before adjustment, an accuracy of the peripheral length of the endless metallic ring does not deteriorate even when the peripheral length of the endless metallic ring before adjustment has a deviation. Accordingly, it is possible to provide the peripheral length adjusting apparatus which improves the accuracy of the peripheral length of the endless metallic ring.

Another aspect of the invention relates to a peripheral length adjusting method for an endless metallic ring in which an endless metallic ring is wound on plural rollers, and an interval between the plural rollers is enlarged such that the endless metallic ring is stretched while the plural rollers are rotated, whereby the endless metallic ring is plastically deformed and a peripheral length of the endless metallic ring is adjusted to a target peripheral length. The peripheral length adjusting method includes the steps of: measuring the peripheral length of the endless metallic ring before the peripheral length is adjusted; and adjusting the peripheral length of the endless metallic ring to the target peripheral length by enlarging the interval between the rollers based on the measured peripheral length such that the peripheral length of the endless metallic ring when the peripheral length is adjusted is longer than the target peripheral length by a contraction amount due to elastic deformation of the endless metallic ring after the peripheral length is adjusted.

In the aforementioned peripheral length adjusting method, since the peripheral length is adjusted considering the contraction amount due to elastic deformation based on the peripheral length before adjustment, an accuracy of the peripheral length of the endless metallic ring does not deteriorate even when the peripheral length of the endless metallic ring before adjustment has a deviation. Accordingly, it is possible to improve the accuracy of the peripheral length of the endless metallic ring.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF THE PREFERRED EMBODIMENTS

Figure 1:
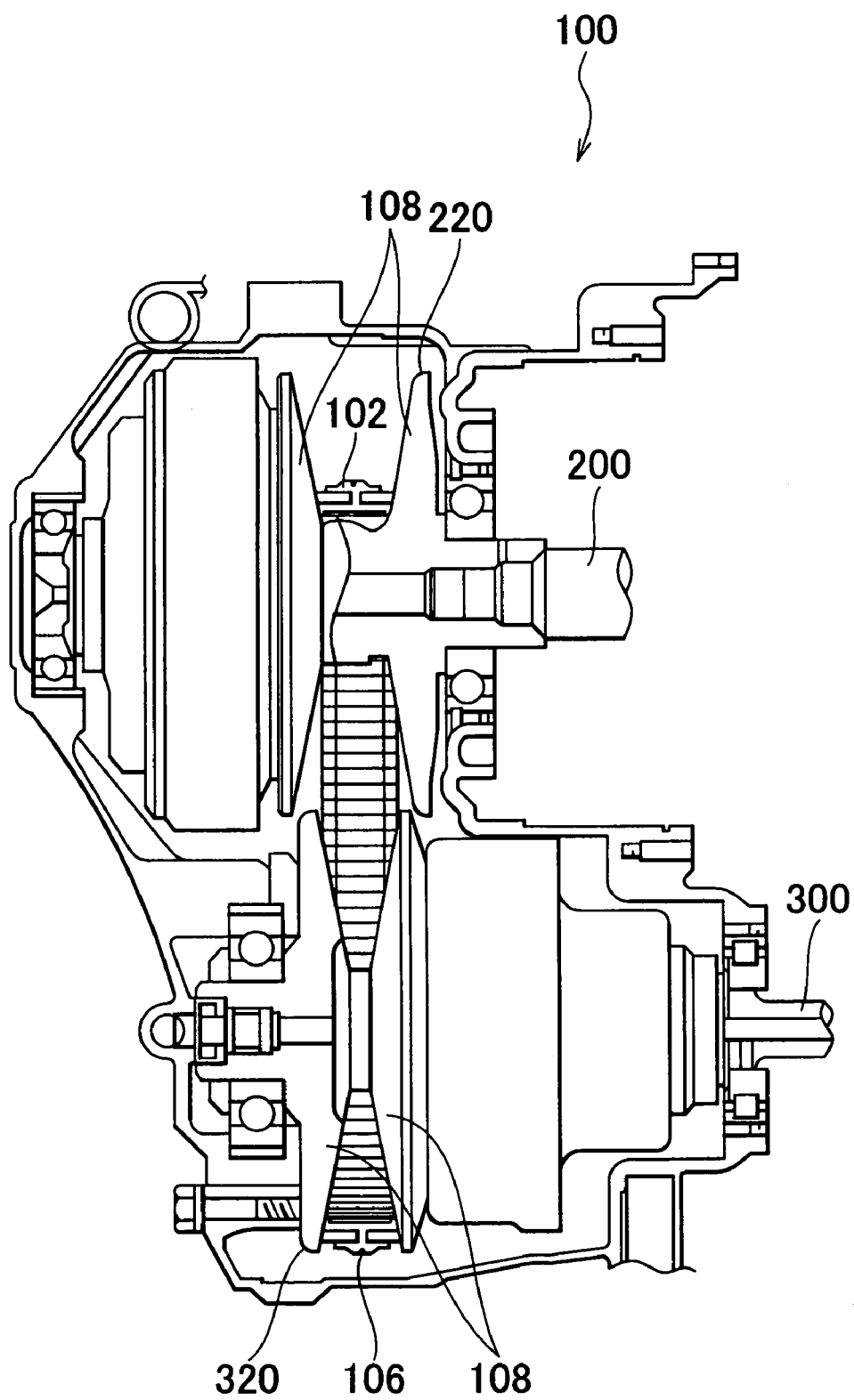
FIG. 1 is a sectional view showing a CVT using an endless metallic belt whose peripheral length is adjusted by a peripheral length adjusting apparatus according to an embodiment of the invention.

In the following description and the accompanying drawings, the present invention will be described in more detail in terms of exemplary embodiments.

Hereinafter, the embodiment of the invention will be described with reference to the accompanying drawings. In the following description, like components are denoted by like reference numerals. Names and functions thereof are the same. Therefore, detailed description thereof will not be repeated.

First, an endless metallic belt and a CVT using the endless metallic belt will be described. The endless metallic belt is formed by annularly arranging multiple elements that face each other in a plate thickness direction, and passing a hoop as an endless metallic ring through each of right and left saddle portions of the elements so as to annularly combine the elements.

Referring to FIG. 1, a CVT 100 using an endless metallic belt will be described. The endless metallic belt is formed using the hoop whose peripheral length is adjusted by a peripheral length adjusting apparatus according to the embodiment of the invention. In the CVT 100, an endless metallic belt 106 is wound on an input side pulley 220 fitted to an input shaft 200 and an output side pulley 320 fitted to an output shaft 300.

Each of the input side pulley 220 and the output side pulley 320 includes a pair of sheaves 108 in which a groove width can be continuously changed. The groove width of each of the input side pulley 220 and the output side pulley 320 is changed using a hydraulic pressure circuit that is controlled according to a running state of a vehicle, whereby each of the belt-winding radii of the endless metallic belt 106 with respect to the input side pulley 220 and the output side pulley 320 is changed. Thus, the ratio between the rotational speed of the input shaft 200 and the rotational speed of the output shaft 300, that is the speed ratio can be continuously changed.

Figure 2:
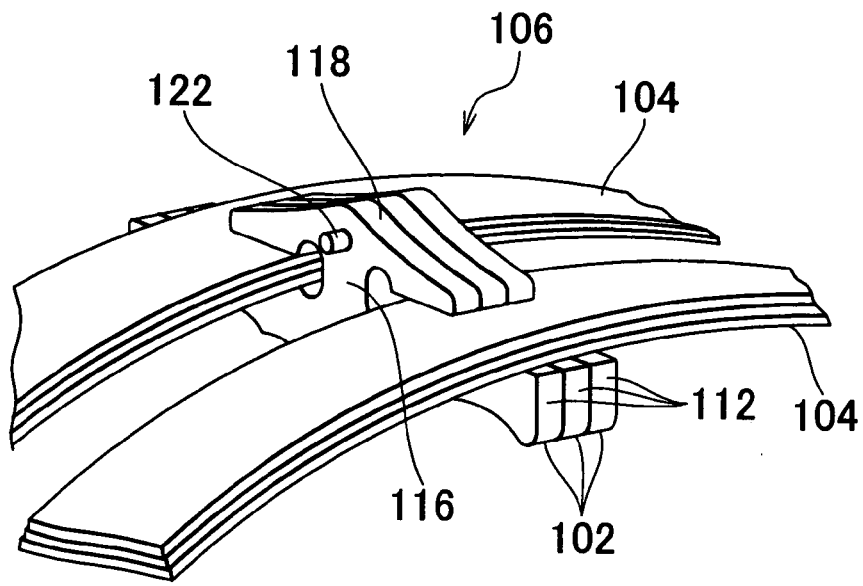
FIG. 2 is a partial perspective view describing the endless metallic belt.
Figure 3:
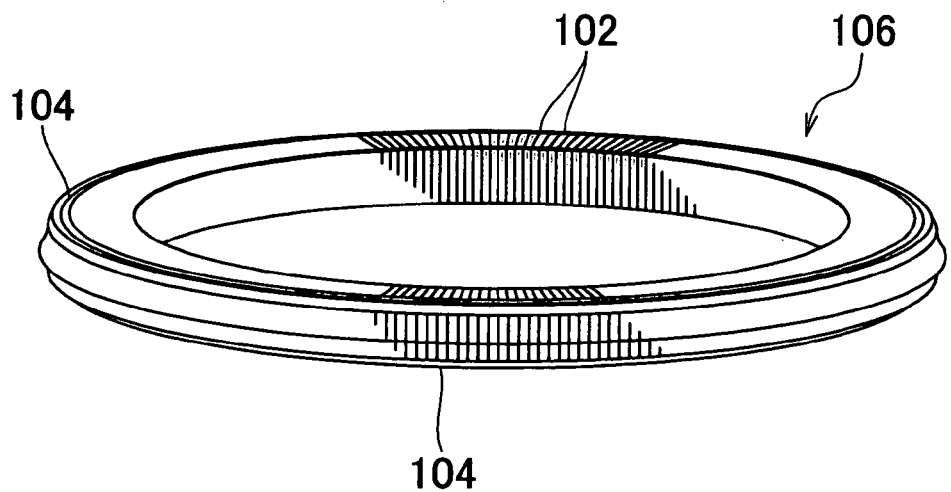
FIG. 3 is a perspective view showing an entire configuration of the endless metallic belt.

Referring to FIG. 2, the endless metallic belt 106 will be described. The endless metallic belt 106 is formed by annularly arranging multiple elements 102 that face each other in a plate thickness direction, and passing a hoop 104 as an endless metallic ring through each of right and left saddle portions of the elements so as to annularly join the elements 102, as shown in FIG. 3.

Figure 4:
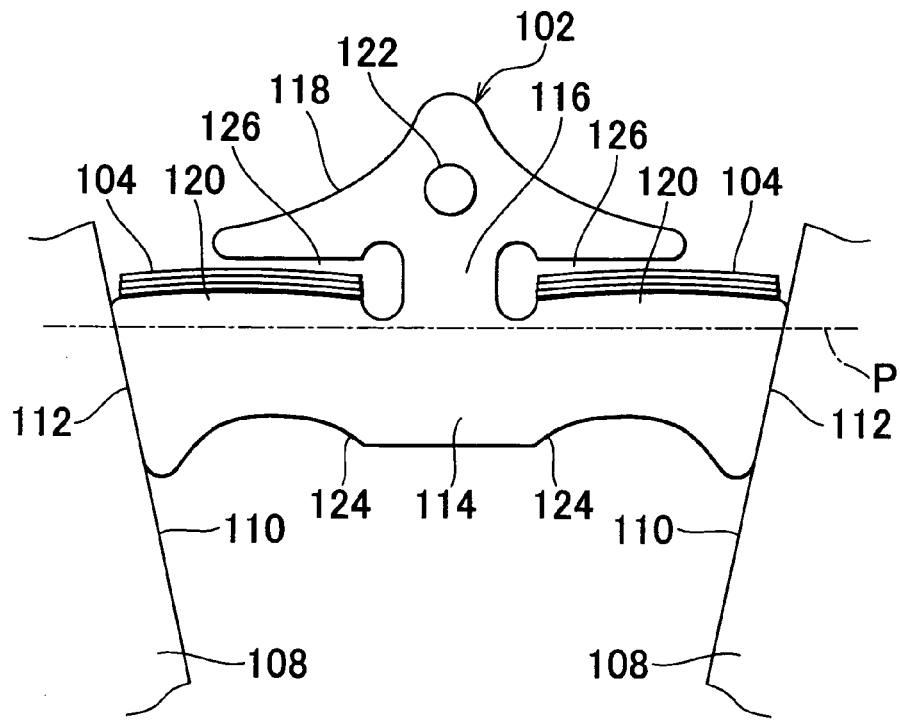
FIG. 4 is a front view of an element.
Figure 5:
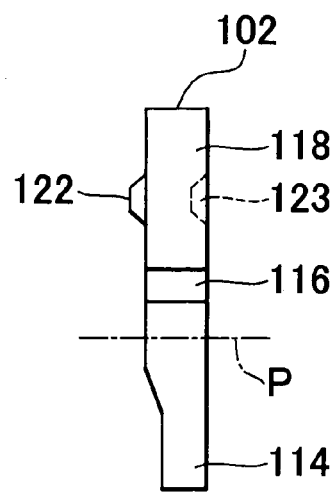
FIG. 5 is a side view of the element.

An example of a shape of the element 102 is shown in FIG. 4 and FIG. 5. Both side surfaces of the element 102 in the width direction are referred to as sheave-contacting friction surfaces 112. The sheave-contacting friction surfaces 112 are tapered surfaces, and contact and match tapered sheave surfaces 110 of the sheaves 108. A neck portion 116 extending upward is provided in a center portion in the width direction of a base body portion 114 including the sheave-contacting friction surfaces 112. The neck portion 116 is continuous to a top portion 118 extending in a lateral direction. Slits 126 are formed between the top portion 118 extending in the lateral direction and the base body portion 114. Each hoop 104 is passed through each of the two slits 126 on the right and left sides. A surface of the base body portion 114 which each hoop 104 contacts is referred to as a saddle surface 120.

The height of the saddle surfaces 120 is expressed as a dimension from a pitch line P which transverses the base body portion 114. The width of the element 102 is expressed as a dimension on the pitch line P. A convex portion 122 is formed on one of both surfaces of the element 102 at a position above the neck portion 116. Also, a dimple 123 is formed on the other of both surfaces of the element 102 at the position above the neck portion 116. Thus, the convex portion 122 and the dimple 123 of the elements 102 which are adjacent to each other are fitted to each other. The surface of the element 102 including the convex portion 122 is regarded as a front surface of the element 102. The surface of the element 102 including the dimple 123 is regarded as a rear surface of the element 102.

As shown in FIG. 4, each saddle surface 120 has a curved convex shape. Each hoop 104 contacts each saddle surface 120 along the curved shape.

The endless metallic belt 106 is sandwiched between the pair of sheaves 108. Since the sheave surfaces 110 and the sheave-contacting friction surfaces 112 are tapered surfaces, a load is applied to each element 102 toward the outside in the radial direction due to pressing force of the sheaves 108. However, since the elements 102 are joined by the hoop 104, movement of the elements 102 toward the outside in the radial direction is restricted by tension of the hoop 104. As a result, due to shearing force of an oil between the sheave surfaces 110 and the sheave-contacting friction surfaces 112, frictional force is generated. Thus, torque is transmitted between the sheaves 108 and the endless metallic belt 106.

More particularly, the hoop 104 includes 9 to 12 hoops which are laminated, and joins the elements 102, as shown in FIG. 2 and FIG. 4 (however, it is shown that the hoop 104 includes 3 hoops instead of 9 to 12 hoops in FIG. 2 and FIG. 4). In this case, as the hoop 104 is arranged as a lower layer, the peripheral length thereof is shorter. As the hoop 104 is arranged as a higher layer, the peripheral length thereof is longer.

Thus, the endless metallic belt 106 is configured using the hoop 104 which includes 9 to 12 hoops 104. The peripheral length of each of the laminated hoops 104 is fine-adjusted. In a process of producing the hoop 104, a thin plate of steel material such as maraging steel is formed into a drum shape by welding. Then, in order to uniformize the composition of the welded portion, solution heat treatment is performed on the plate. As the solution heat treatment, for example, heat treatment is performed in a vacuum furnace for a predetermined time at a predetermined temperature. The thin plate of steel material having the drum shape is cut into hoops each of which has a predetermined width, and the peripheral length and the thickness of each hoop is made uniform. Then, in order to remove processing residual stress, solution heat treatment is performed on the hoops. Subsequently, the peripheral length of each hoop 104 is fine-adjusted. In the process of this fine-adjustment, the peripheral length adjusting apparatus according to the embodiment of the invention is used.

Figure 6:
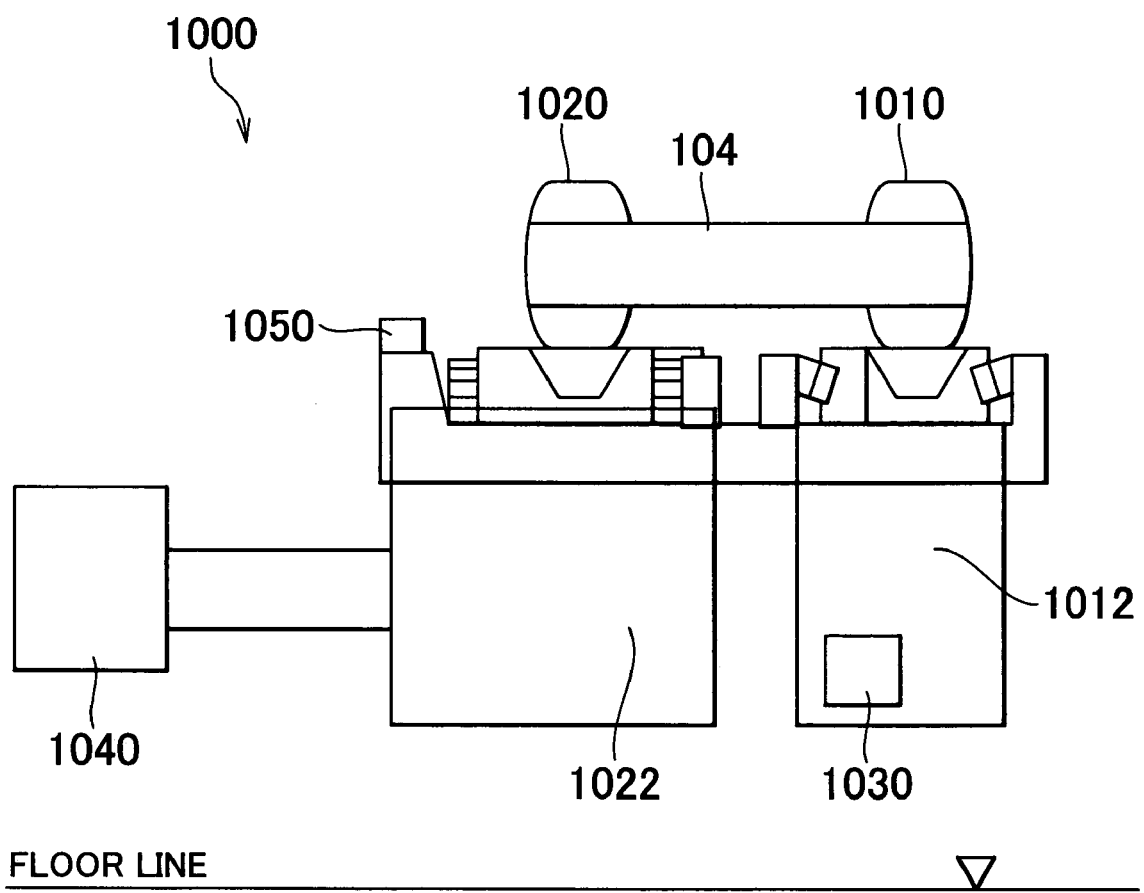
FIG. 6 is a schematic view showing a peripheral length adjusting apparatus according to the embodiment of the invention.

FIG. 6 is a schematic side view showing a peripheral length adjusting apparatus 1000 according to the embodiment of the invention. The peripheral length adjusting apparatus 1000 includes a first roller 1010 and a second roller 1020 on which a hoop 104 is wound, a drive mechanism 1012 for the first roller, a drive mechanism 1022 for the second roller, a moving mechanism 1040 for the second roller, a detecting portion 1030 which detects a moving amount of the second roller 1020, and a temperature sensor 1050 which measures the temperature of the hoop 104 at the time of adjustment. The first roller 1010 is rotated by the drive mechanism 1012 and the second roller 1020 is rotated by the drive mechanism 1022. The moving mechanism 1040 moves the second roller 1020 in a horizontal direction such that the interval between the second roller 1020 and the first roller 1010 is changed. The detecting portion 1030 detects the moving amount of the second roller 1020.

The peripheral length adjusting apparatus 1000 is controlled by a control portion (not shown). The control portion receives the moving amount of the second roller 1020 from the detecting portion 1030, and the temperature of the hoop 104 from the temperature sensor 1050. Also, the control portion receives the volume of the hoop 104 before adjustment of the peripheral length, and the peripheral length of the hoop 104 after adjustment.

The control portion controls the moving mechanism 1040 for the second roller 1020 such that the interval between the relative positions of the first roller 1010 and the second roller 1020 becomes equal to a predetermined value. While the first roller 1010 and the second roller are in this state, the hoop 104 is wound on the first roller 1010 and the second roller 1020. The control portion controls the rotation of the first roller 1010 and the rotation of the second roller 1020. In addition, the control portion changes the interval between the first roller 1010 and the second roller 1020. The control portion moves the second roller 1020 to a target position while rotating the first roller 1010 and the second roller 1020. Thus, predetermined stretching force (F) is applied to the hoop 104, which makes it possible to adjust the peripheral length of the hoop 104 to a target peripheral length. At this time, a speed at which the second roller 1020 is moved is set to a speed at which a load (load in a plastic zone) that causes plastic deformation can be applied to the hoop 104.

Then, the second roller 1020 is moved to a position such that the peripheral length of the hoop 104 is adjusted to a peripheral length which is longer than the target peripheral length by a contraction amount. Movement of the second roller 1020 is stopped at this position, and thus the process of stretching the hoop 104 is completed. In this process, a rate of the contraction amount may be considered instead of the contraction amount. The contraction amount signifies a length obtained by subtracting a peripheral length L(3) of the hoop 104 which is measured after the hoop 104 is removed from the peripheral length adjusting apparatus 1000 from a peripheral length L(2) of the hoop 104 at the time of adjustment by the peripheral length adjusting apparatus 1000. The rate of the contraction amount signifies a value obtained by dividing the contraction amount by a peripheral length L(1) of the hoop 104 before adjustment. Hereinafter, the contraction amount will be referred to as "spring back amount", and the rate of the contraction amount will be referred to as "spring back rate". The spring back rate is denoted by a reference character $\alpha$.

Figure 7:
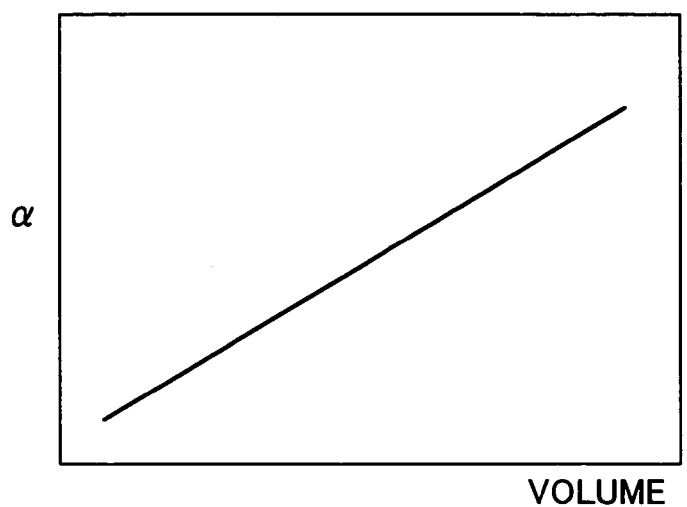
FIG. 7 is a graph showing a relationship between a volume of a hoop before a peripheral length thereof is adjusted and a spring back rate.
Figure 8:
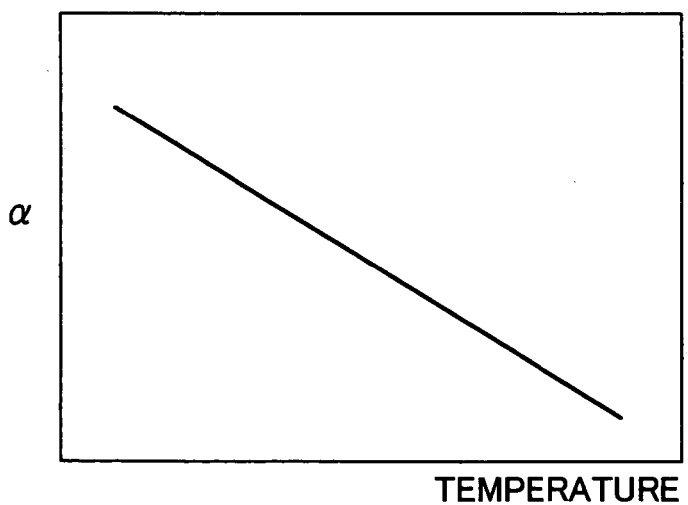
FIG. 8 is a graph showing a relationship between a temperature of a hoop when the peripheral length thereof is adjusted and the spring back rate.

The spring back rate $\alpha$ varies according to the volume of the hoop 104 before adjustment, and the temperature of the hoop 104 at the time of adjustment. The control portion stores the change in the spring back rate $\alpha$ in a memory. FIG. 7 is a graph showing a relationship between the volume of the hoop 104 before adjustment and the spring back rate $\alpha$. FIG. 8 is a graph showing a relationship between the temperature of the hoop 104 at the time of adjustment and the spring back rate $\alpha$. As shown in FIG. 7, the control portion can calculate the spring back rate $\alpha$ based on the volume of the hoop 104 before adjustment. As shown in FIG. 8, the control portion can calculate the spring back rate $\alpha$ based on the temperature of the hoop 104 at the time of adjustment. The relationship between the volume of the hoop 104 and the spring back rate $\alpha$ shown in FIG. 7, and the relationship between the temperature of the hoop 104 and the spring back rate $\alpha$ shown in FIG. 8 are exemplary, and the invention is not limited to the relationships shown in FIG. 7 and FIG. 8.

Figure 9:
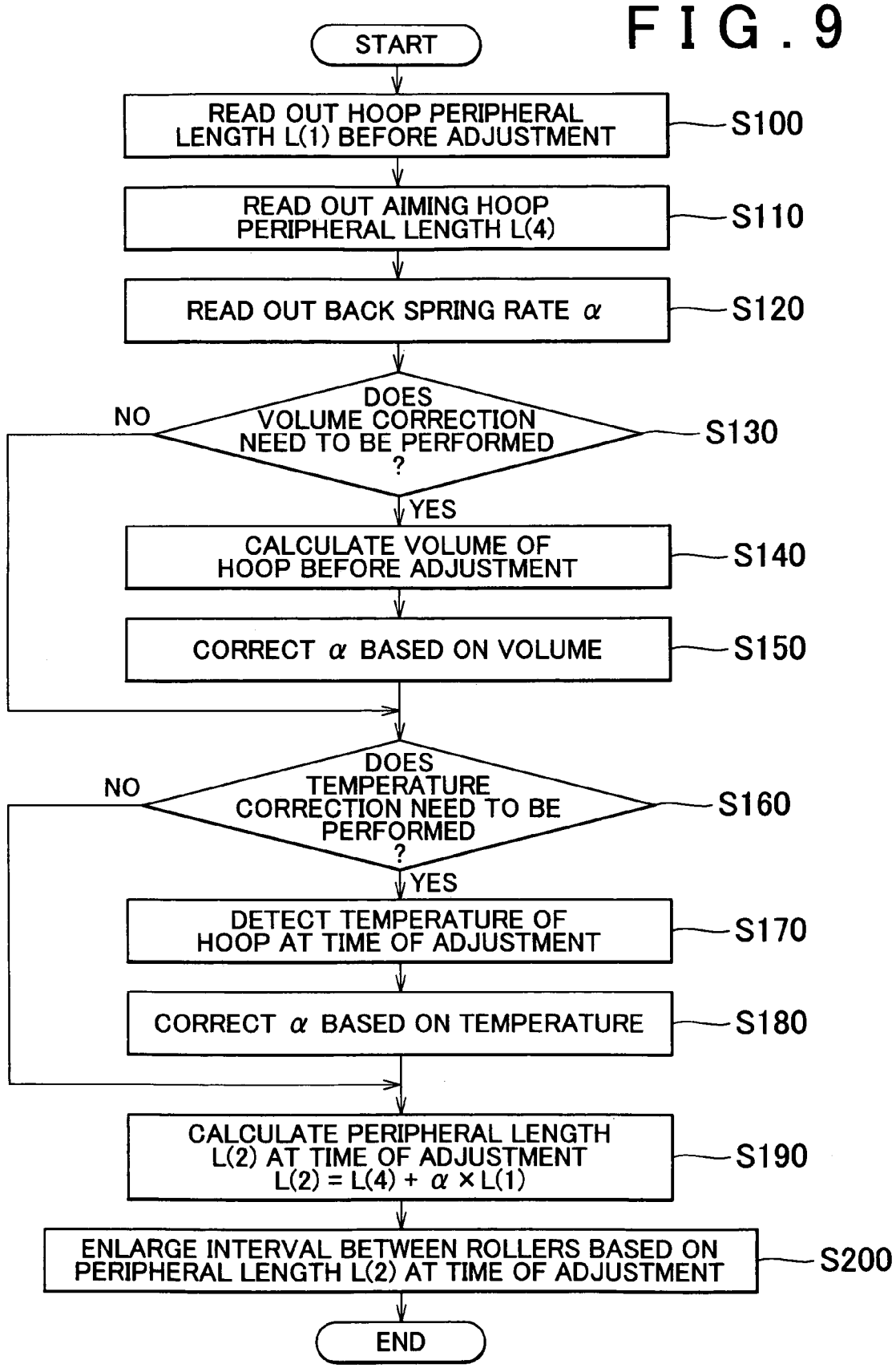
FIG. 9 is a flowchart showing a procedure of control for deciding the peripheral length at the time of adjustment, which is performed in the peripheral length adjusting apparatus according to the embodiment of the invention.

Referring to FIG. 9, description will be made of a control structure of a program for deciding the peripheral length when the peripheral length of the hoop 104 is adjusted, which is performed by the control portion in the peripheral length adjusting apparatus 1000 according to the embodiment of the invention.

In step 100, the control portion reads out, from the memory, the peripheral length L(1) of the hoop 104 before adjustment. The peripheral length L(1) of the hoop 104 before adjustment is stored in the memory in advance. In step S110, the control portion reads out, from the memory, an aiming peripheral length L(4) of the hoop 104 which is the target peripheral length after adjustment by the peripheral length adjusting apparatus 1000. In step S120, the control portion reads out, from the memory, the spring back rate $\alpha$ corresponding to the hoop 104 subjected to the peripheral length adjusting processing. The spring back rates a according to types of metal of the hoop 104 and the like are stored in the memory in advance.

In step S130, the control portion makes a determination as to whether the spring back rate $\alpha$ needs to be corrected based on the volume of the hoop 104, that is, a volume correction needs to be performed. This determination is made based on information input to the control portion. If the volume correction of the spring back rate $\alpha$ needs to be performed (i.e., YES in step S130), the process proceeds to step S140. If not (i.e., NO in step S130), the process proceeds to step S160.

In step S140, the control portion calculates the volume of the hoop 104 before adjustment. The volume of the hoop 104 may be calculated based on the weight of the hoop 104 before adjustment and the density of the metal constituting the hoop 104, or based on the width, the thickness, and the peripheral length of the hoop 104 before adjustment. In step S150, the control portion corrects the spring back rate $\alpha$ based on the volume calculated in step S140. At this time, the map shown in FIG. 7 is used.

In step S160, the control portion makes a determination as to whether the spring back rate $\alpha$ needs to be corrected based on the temperature of the hoop 104, that is, a temperature correction needs to be performed. This determination is made based on information input to the control portion. If the temperature correction of the spring back rate $\alpha$ needs to be performed (i.e., YES in step S160), the process proceeds to step S170. If not (i.e., NO in step S160), the process proceeds to step S190.

In step S170, the control portion detects the temperature of the hoop 104 at the time of adjustment based on the information input from the temperature sensor 1050. In step S180, the control portion corrects the spring back rate α based on the temperature detected in step S170. At this time, the map shown in FIG. 8 is used.

In step S190, the control portion calculates the peripheral length L(2) at the time of adjustment, using an equation L(4)+α×L (1). In step S200, the control portion expands the interval between the first roller 1010 and the second roller 1020 based on the peripheral length L(2) at the time of adjustment, which was calculated in step S190. More particularly, the moving amount of the second roller 1020 is obtained using the interval between the first roller 1010 and the second roller 1020 which is calculated based on the peripheral length L(2) at the time of adjustment. Then, the moving mechanism 1040 for the second roller is controlled such that a difference between the moving amount of the second roller 1020 which is detected by the detecting portion 1030 and the obtained moving amount becomes 0. Thus, the interval between the first roller 1010 and the second roller 1020 is adjusted.

Description will be made of the operation of the peripheral length adjusting apparatus according to the embodiment of the invention, which is based on the structure and the flowchart described above.

With regard to one hoop 104 subjected to the peripheral length adjusting processing, an operator measures the peripheral length L(1) before adjustment, and makes the memory store the peripheral length L(1). Also, the operator makes the memory store the aiming peripheral length L(4) which is the target peripheral length of the hoop 104 after adjustment. Further, the operator makes the memory store the spring back rate α of the hoop 104.

Then, with regard to the hoop 104 subjected to the peripheral length adjusting processing, the peripheral length L(1) before adjustment, the aiming peripheral length L(4), and the spring back rate α of the hoop 104 are read out from the memory (steps S100, S110, S120). If the volume correction needs to be performed (i.e., YES in step S130), the volume of the hoop 104 before adjustment is calculated (S140). The spring back rate α is corrected based on the calculated volume using the map shown in FIG. 7 (S150). If the temperature correction needs to be performed (i.e., YES in step S160), the temperature of the hoop 104 at the time of adjustment is detected (S170), and the spring back rate α is corrected based on the detected temperature using the map shown in FIG. 8 (S180).

Based on the peripheral length L(1) before adjustment, the aiming peripheral length L(4), and the corrected spring back rate α, the peripheral length L(2) at the time of adjustment is calculated using the equation L(4)+α×L (1) (S190). Based on the calculated peripheral length L(2) at the time of adjustment, the control portion controls the moving mechanism 1040 for the second roller so as to adjust the interval between the first roller 1010 and the second roller 1020 (S200).

As described above, in the peripheral length adjusting apparatus for an endless metallic ring according to the embodiment of the invention, the peripheral length at the time of adjustment is calculated considering the spring back amount. The spring back amount varies according to the peripheral length of the metallic ring before adjustment. Since the peripheral length at the time of adjustment is calculated based on the peripheral length before adjustment, the target peripheral length, and the spring back rate, the accuracy of the peripheral length of the endless metallic belt does not deteriorate even when the peripheral length of the endless metallic ring before adjustment has a deviation. The spring back rate varies according to the volume of the hoop before adjustment, and the temperature of the hoop at the time of adjustment as well. Since the spring back rate is corrected considering the volume of the hoop before adjustment and the temperature of the hoop at the time of adjustment, the peripheral length of the hoop can be adjusted without being influenced by variation in the volume of the hoop before adjustment or a change in the temperature of the hoop at the time of adjustment.

The spring back rate may have a deviation due to a deviation of composition of the endless metallic ring resulting from a deviation of processing in a preparation process. In this case, with regard to approximately 10 endless metallic rings in each production lot, the peripheral length L(3) after adjustment may be measured, and the interval between the first roller 1010 and the second roller 1020 which is calculated based on the peripheral length L (2) at the time of adjustment may be corrected such that a difference between the measured peripheral length L(3) and the aiming peripheral length L(4) becomes 0. More particularly, a correction value for the spring back rate α, which is set such that the difference between the average of the measured peripheral lengths L(3) and the aiming peripheral length L(4) becomes 0, may be calculated, and the spring back rate α may be corrected using the correction value. Alternatively, a correction value for the interval between the first roller 1010 and the second roller 1020 may be calculated, and the interval may be corrected using the correction value. When the interval between the first roller 1010 and the second roller 1020 at the time of adjustment is corrected, the peripheral length of the endless metallic ring can be adjusted to the target peripheral length with high accuracy even when the spring back rate has a deviation due to a deviation of composition of the endless metallic ring resulting from a deviation of processing in a preparation process.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A peripheral length adjusting apparatus for an endless metallic ring in which an endless metallic ring is wound on plural rollers, and an interval between the plural rollers is enlarged such that the endless metallic ring is stretched while the plural rollers are rotated, whereby the endless metallic ring is plastically deformed and a peripheral length of the endless metallic ring is adjusted to a target peripheral length, comprising:

a peripheral length measuring device which measures the peripheral length of the endless metallic ring before the peripheral length is adjusted;

an adjusting device which adjusts the peripheral length of the endless metallic ring to the target peripheral length by enlarging the interval between the rollers based on the measured peripheral length such that the peripheral length of the endless metallic ring when the peripheral length is adjusted is longer than the target peripheral length by a contraction amount due to elastic deformation of the endless metallic ring after the peripheral length is adjusted;

a volume measuring device which measures a volume of the endless metallic ring before the peripheral length is adjusted; and a changing device which chances the rate of the contraction amount based on the measured volume;

wherein the adjusting device adjusts the peripheral length of the endless metallic ring to the target peripheral length by enlarging the interval between the rollers based on a rate of the contraction amount due to elastic deformation of the endless metallic ring after the peripheral length is adjusted with respect to the peripheral length of the endless metallic ring before the peripheral length is adjusted, the rate of the contraction amount having being obtained in advance.

2. The peripheral length adjusting apparatus for an endless metallic ring according to claim 1, wherein the peripheral length measuring device measures the peripheral length of the endless metallic ring after the peripheral length is adjusted, and the peripheral length adjusting apparatus further comprises a changing device which changes the rate of the contraction amount based on a difference between the measured peripheral length and the target peripheral length.

3. The peripheral length adjusting apparatus for an endless metallic ring according to claim 1, wherein the peripheral length measuring device measures the peripheral length of the endless metallic ring after the peripheral length is adjusted, and the peripheral length adjusting apparatus further comprises a correcting device which corrects, based on a difference between the measured peripheral length and the target peripheral length, the interval between the rollers when the peripheral length is adjusted, the interval having being calculated considering the target peripheral length, and at least one of the contraction amount and the rate of the contraction amount.

4. A peripheral length adjusting apparatus for an endless metallic ring in which an endless metallic ring is wound on plural rollers, and an interval between the plural rollers is enlarged such that the endless metallic ring is stretched while the plural rollers are rotated, whereby the endless metallic ring is plastically deformed and a peripheral length of the endless metallic ring is adjusted to a target peripheral length, comprising:

a peripheral length measuring device which measures the peripheral length of the endless metallic ring before the peripheral length is adjusted;

an adjusting device which adjusts the peripheral length of the endless metallic ring to the target peripheral length by enlarging the interval between the rollers based on the measured peripheral length such that the peripheral length of the endless metallic ring when the peripheral length is adjusted is longer than the target peripheral length by a contraction amount due to elastic deformation of the endless metallic ring after the peripheral length is adjusted;

a temperature measuring device which measures a temperature of the endless metallic ring when the peripheral length is adjusted; and a changing device which chances the rate of the contraction amount based on the measured temperature; and wherein the adjusting device adjusts the peripheral length of the endless metallic ring to the target peripheral length by enlarging the interval between the rollers based on a rate of the contraction amount due to elastic deformation of the endless metallic ring after the peripheral length is adjusted with respect to the peripheral length of the endless metallic ring before the peripheral length is adjusted, the rate of the contraction amount having being obtained in advance.

5. The peripheral length adjusting apparatus for an endless metallic ring according to claim 2, wherein the peripheral length measuring device measures the peripheral length of the endless metallic ring after the peripheral length is adjusted, and the peripheral length adjusting apparatus further comprises a changing device which changes the rate of the contraction amount based on a difference between the measured peripheral length and the target peripheral length.

6. The peripheral length adjusting apparatus for an endless metallic ring according to claim 4, wherein the peripheral length measuring device measures the peripheral length of the endless metallic ring after the peripheral length is adjusted, and the peripheral length adjusting apparatus further comprises a correcting device which corrects, based on a difference between the measured peripheral length and the target peripheral length, the interval between the rollers when the peripheral length is adjusted, the interval having being calculated considering the target peripheral length, and at least one of the contraction amount and the rate of the contraction amount.

7. A peripheral length adjusting method for an endless metallic ring in which an endless metallic ring is wound on plural rollers, and an interval between the plural rollers is enlarged such that the endless metallic ring is stretched while the plural rollers are rotated, whereby the endless metallic ring is plastically deformed and a peripheral length of the endless metallic ring is adjusted to a target peripheral length, comprising the following steps of:

measuring the peripheral length of the endless metallic ring before the peripheral length is adjusted;

measuring a volume of the endless metallic ring before the peripheral length is adjusted;

changing the rate of the contraction amount based on the measured volume;

adjusting the peripheral length of the endless metallic ring to the target peripheral length by enlarging the interval between the rollers based on a rate of the contraction amount due to elastic deformation of the endless metallic ring after the peripheral length is adjusted with respect to the peripheral length of the endless metallic ring before the peripheral length is adjusted, the rate of the contraction amount having being obtained in advance; and adjusting the peripheral length of the endless metallic ring to the target peripheral length by enlarging the interval between the rollers based on the measured peripheral length such that the peripheral length of the endless metallic ring when the peripheral length is adjusted is longer than the target peripheral length by a contraction amount due to elastic deformation of the endless metallic ring after the peripheral length is adjusted.

8. The peripheral length adjusting method for an endless metallic ring according to claim 7, further comprising the following steps of:

measuring the peripheral length of the endless metallic ring after the peripheral length is adjusted; and changing the rate of the contraction amount based on a difference between the measured peripheral length and the target peripheral length.

9. The peripheral length adjusting method for an endless metallic ring according to claim 7, further comprising the following steps of:

measuring the peripheral length of the endless metallic ring after the peripheral length is adjusted; and correcting, based on a difference between the measured peripheral length and the target peripheral length, the interval between the rollers when the peripheral length is adjusted, the interval having being calculated considering the target peripheral length, and at least one of the contraction amount and the rate of the contraction amount.

10. A peripheral length adjusting method for an endless metallic ring in which an endless metallic ring is wound on plural rollers, and an interval between the plural rollers is enlarged such that the endless metallic ring is stretched while the plural rollers are rotated, whereby the endless metallic ring is plastically deformed and a peripheral length of the endless metallic ring is adjusted to a target peripheral length, comprising the following steps of:

measuring the peripheral length of the endless metallic ring before the peripheral length is adjusted;

adjusting the peripheral length of the endless metallic ring to the target peripheral length by enlarging the interval between the rollers based on the measured peripheral length such that the peripheral length of the endless metallic ring when the peripheral length is adjusted is longer than the target peripheral length by a contraction amount due to elastic deformation of the endless metallic ring after the peripheral length is adjusted;

measuring a temperature of the endless metallic ring when the peripheral length is adjusted;

changing the rate of the contraction amount based on the measured temperature; and adjusting the peripheral length of the endless metallic ring to the target peripheral length by enlarging the interval between the rollers based on a rate of the contraction amount due to elastic deformation of the endless metallic ring after the peripheral length is adjusted with respect to the peripheral length of the endless metallic ring before the peripheral length is adjusted, the rate of the contraction amount having being obtained in advance.

11. The peripheral length adjusting method for an endless metallic ring according to claim 10, further comprising the following steps of:

measuring the peripheral length of the endless metallic ring after the peripheral length is adjusted; and changing the rate of the contraction amount based on a difference between the measured peripheral length and the target peripheral length.

12. The peripheral length adjusting method for an endless metallic ring according to claim 10, further comprising the following steps of:

measuring the peripheral length of the endless metallic ring after the peripheral length is adjusted;

and correcting, based on a difference between the measured peripheral length and the target peripheral length, the interval between the rollers when the peripheral length is adjusted, the interval having being calculated considering the target peripheral length, and at least one of the contraction amount and the rate of the contraction amount.

* * * * *